Aug. 2, 1949.    C. R. STOCK    2,477,908
INSTRUMENT FOR MEASURING IMPACT
STRENGTH OF MATERIALS
Filed Nov. 15, 1944    2 Sheets-Sheet 1
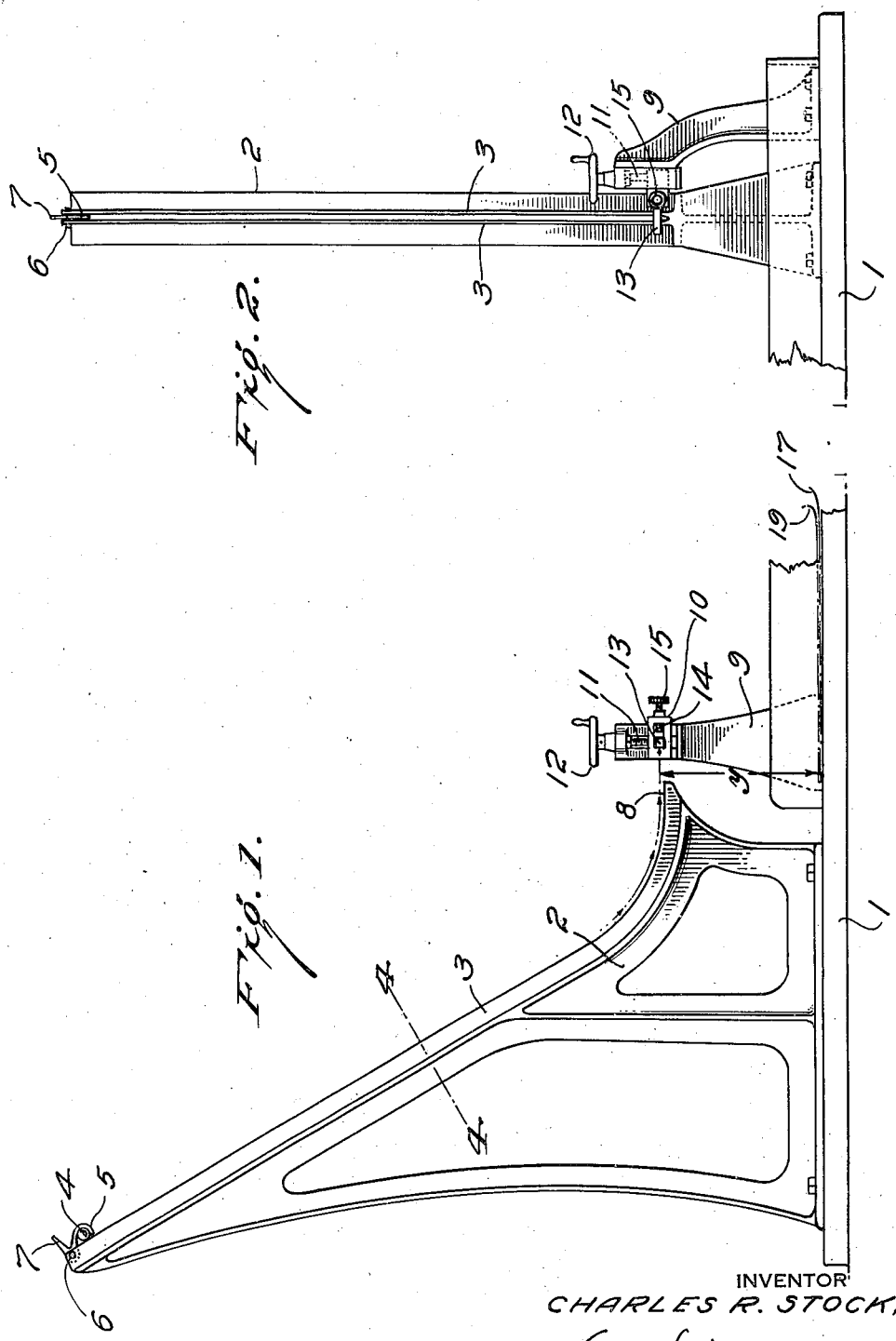
INVENTOR
CHARLES R. STOCK,
BY
ATTORNEY

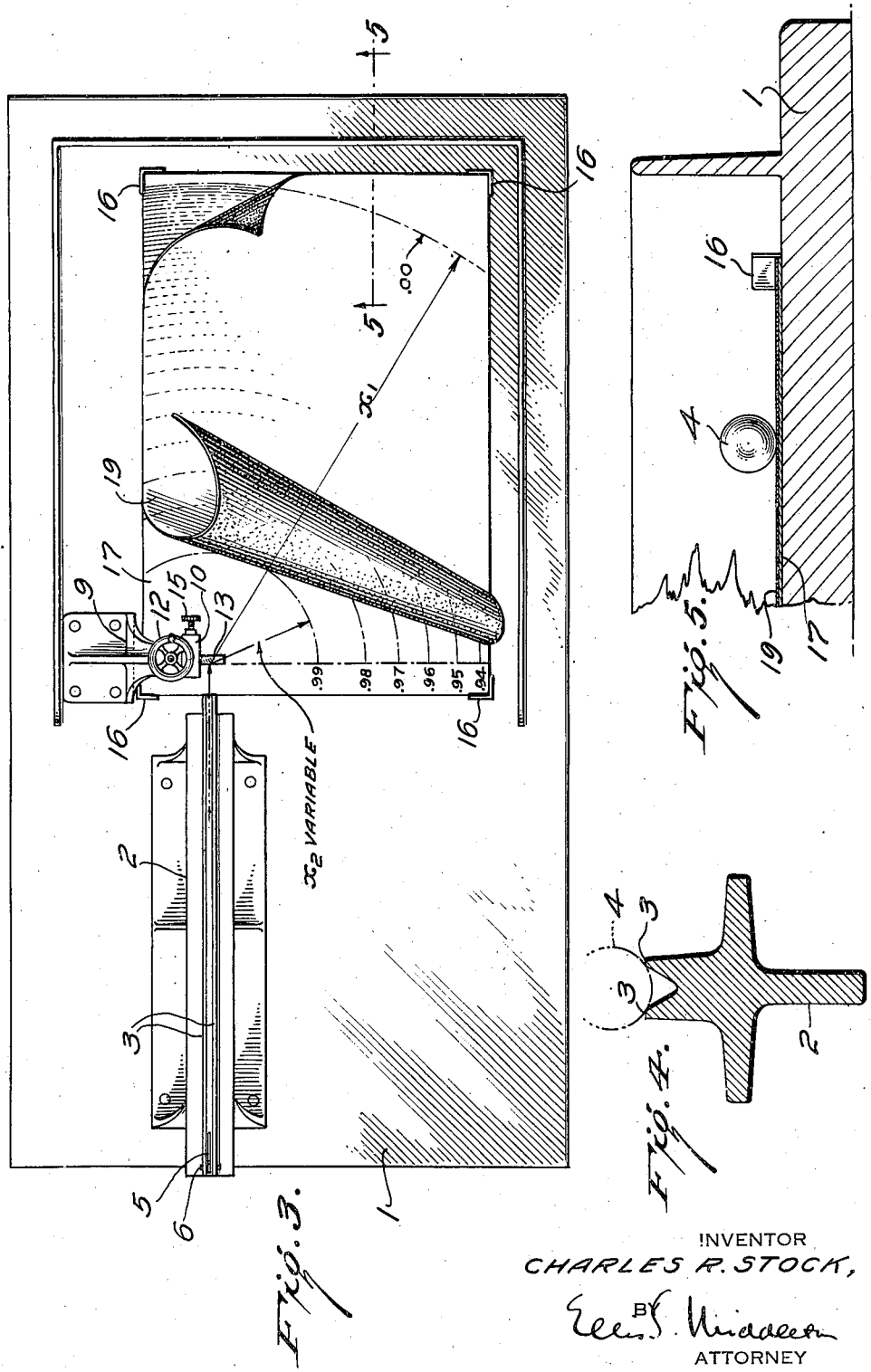

Patented Aug. 2, 1949

2,477,908

UNITED STATES PATENT OFFICE 2,477,908

INSTRUMENT FOR MEASURING IMPACT STRENGTH OF MATERIALS

Charles R. Stock, Greenwich, Conn., assignor to American Cyanamid Company, New York, N. Y., a corporation of Maine Application November 15, 1944, Serial No. 563,594

6 Claims. (Cl. 73—12.)

1

The present invention relates to a method and device for determining the energy required to fracture a specimen of fracturable material.

In this art many proposals have been made for producing an impact of a known force on standard shaped and sized specimens of the material. Perhaps the most widely accepted shape of specimen is one approximately 2½ inches long, approximately ½ inch wide and approximately ½ inch thick either with or without a notch at the center thereof where the thickness of material from the bottom of the notch to the opposite face of the specimen is approximately .4 inch. Such a specimen when held for the impact test in a cantilevered manner is known as a "cantilevered specimen" by the American Society for Testing Materials.

This form of specimen is particularly used where it is desired to determine the energy necessary to fracture such materials as resins, ceramics, glass and the like.

For instance, a present widely used impact testing apparatus for determining the impact strength of materials consists of a pendulum which is allowed to oscillate on its axis, being released from a height which will accelerate the striking edge to a velocity of about 12 feet per second at the bottom of its swing. The impact takes place at the bottom of the arc. Such an apparatus is objectionable in that the mass of the pendulum is restricted in several ways. For instance, it must be so distributed that the center of percussion has substantially the same radius as the striking edge and also so that the kinetic energy available is of the correct amount for the particular tests. These requirements are met in general when a large portion of the total mass is concentrated closely around the striking edge, leaving the supporting arm as light as is consistent with the requirements of stiffness and serviceability. When, however, it is desired to test relatively brittle substances where, for most precise results, the energy delivered should not greatly exceed that necessary to produce fracture, a serious problem arises. In order to maintain the desired striking velocity while reducing the kinetic energy developed, the mass must be reduced to a value where a serviceable and stiff supporting arm would utilize such a large fraction of the total mass that the center of percussion

2 would be sensibly shifted away from the striking edge. In this range, therefore, a pendulum apparatus becomes unsatisfactory.

Another proposal is to use a so called "guillotine" method, wherein the mass falls vertically, either freely or guided by rails, and strikes the specimen from the top. Here the energy range is theoretically unlimited since the center of gravity and the center of percussion can readily be made coaxial. Where guide rails are used, the velocity is erratically effected, from one test to the next, by the chance occurrence of sliding friction as the falling weight touches the rails on its way down. In both cases, when the specimen breaks it is extremely difficult, if not impossible, to measure the excess kinetic energy remaining in the weight and for this reason it has not been attempted.

The principal object of the present invention, therefore, is to determine the fracture energy required of a moving striker where the kinetic energy of the striker before and after breaking the specimen may be readily and accurately calculated with minimum errors and eliminating the human factors.

Another important object of the invention is the accomplishment of the above by means of a simple apparatus which will be of sturdy construction but readily flexible and adapted to the use of strikers of different weight masses.

To this end the invention contemplates developing a known and predetermined amount of kinetic energy in a supported striker, contacting the striker with a specimen and thereafter measuring reasonably accurately the residual and excess horizontal kinetic energy remaining in the striker. The difference between these two factors is the energy required to fracture the specimen.

A convenient way of accomplishing the above is to permit a ball of known weight to roll down an incline, the end portion of which causes the ball to have a horizontal end run. At the time the ball reaches the end of the run way, it should have acquired energy slightly greater than that required to fracture the specimen. At that point the specimen is struck by the striker, the former broken and the ball continues its flight in a parabolic curve until it strikes a horizontal surface. This surface is of a character which will record the point of contact of the ball therewith so that the horizontal distance travelled by the ball after breaking the specimen may be measured. Knowing the height of the point of contact between the ball and the specimen above the horizontal surface and the horizontal kinetic energy of the ball at the time of impact with the specimen it becomes a simple mathematical problem to calculate the energy absorbed in breaking the specimen.

In this proposal the advantages of a pendulum and a guillotine are retained while avoiding the objectionable features thereof. Thus acceleration is produced by the vertical operation of the force of gravity, but the direction of the accelerated striking mass is changed to the horizontal for the impact. This change of direction is not produced by an arm suspension which is part of the mass and which, therefore, effects its dynamics as in the case of a pendulum, but rather by guide rails which support the striker from below and do not affect its relationship of center of percussion to point of impact. Since the direction of the mass is presumably horizontal as it leaves its run way, its path at any time during free fall will be a parabolic arc the mathematical relations of which permit the ready measurement of the horizontal component of velocity and, therefore, the horizontal translational kinetic energy. Such a proposal has the advantage over the guillotine method in that contact of the striker with its guide rails is a constant which may be taken into consideration and it is a simple matter to determine the residual and unopposed kinetic energy of the striker.

The invention further includes a device for accomplishing the above purpose which may take the form of guide rails arranged at some convenient angle between the horizontal and vertical so as to obtain the desired gravitational acceleration of the striker, the guide rails or other support having a horizontal end run so as to project the striker therefrom in a horizontal direction. A vice or structure is provided for holding the specimen in the path of the striker when projected from its horizontal end run. A record sheet is arranged on a horizontal surface beneath and beyond the specimen having a point of reference vertically below the point of contact between the striker and the specimen. This record sheet may be calibrated according to well known mathematical formulas and subdivisions with reference lines placed thereon to indicate where a striker will fall after breaking a specimen and having any residual amount of its total horizontal kinetic energy. Thus the minimum and maximum points of reference on the record sheet would be that at which all of the horizontal kinetic energy developed by the striker is absorbed in fracturing the specimen and the striker thereafter would fall vertically therefrom. The maximum point of reference on the record would be that point at which the striker would contact therewith if no specimen interfered with its parabolic flight from the end of the run way. This last point of reference would represent unity or that the striker at that point contained 100% horizontal kinetic energy. Any suitable number of graduations may be made between the minimum and maximum points of reference so as to read directly in terms of the horizontal kinetic energy absorbed in breaking the specimen. It is preferable that such a record sheet be covered with some material such as carbon paper so that when the striker falls thereon it will leave an imprint on the record to mark its point of contact.

The invention further includes the novel construction, combination and arrangement of parts and the manner of use as more fully hereinafter pointed out in the description and shown in the drawings.

In the drawings:

Fig. 1 is a side elevation of the device constructed according to the invention.

Fig. 2 is a front view of the device of Fig. 1.

Fig. 3 is a plan view of the device of Fig. 1.

Fig. 4 is a sectional view along the line 4—4 of Fig. 1.

Fig. 5 is a detail showing the striker-carbon paper-record sheet combination along the line 5—5 of Fig. 3.

Referring now to the drawings, a base is shown at 1 carrying an inclined support 2 having parallel guide rails 3 adapted to support a striker which in this case is ball 4. Any desired form of striker may be used which may be gravitationally accelerated and which may have an accurate point of contact not only with the specimen but with the horizontal surface after breaking the latter. A ball is the most convenient form of striker.

A cradle 5 pivoted as at 6 may be made to hold the striker 4 until ready for use and released for its run by the operation of trigger 7.

The major portion of the runway constituted by rails 3 may be arranged at any angle between the horizontal and the vertical terminating in a comparatively short horizontal end run 8.

Also carried by the base 1 is a vice for holding the specimen in a cantilevered manner. This may include a bracket 9 carrying a clamp 10 mounted for vertical sliding motion on the bracket 9 and adjustable to any desired vertical position by means of screw 11 which bears thereagainst and operated by handwheel 12. The clamp 10 is apertured so as to receive a specimen 13 of the material undergoing test, the specimen being held within the clamp by reason of screw 14 and knurled knob 15. The specimen may, therefore, be adjusted vertically so as to assure impact of the striker therewith at the correct point. Other suitable structures may be substituted for holding specimens which are to be fractured other than as cantilevers, such as doubly supported simple beams. It is to be noted that there is a space between the end of the horizontal portion of the rails 3 and the near face of the specimen 13. The dimensions of this space should be greater than the larger dimension of the striker so that in the event that the horizontal kinetic energy developed by the striker at the time of impact with the specimen is equal to or less than that required to break the specimen the striker may move downwardly through this space and toward the record sheet.

Beneath the specimen is a horizontal surface having corner guides 16 arranged to receive a record sheet 17 in the desired position. On the record sheet are drawn reference lines 18 the position of which will be hereinafter described.

Overlying the record sheet 17 is a piece of carbon paper 19 so that when the striker 4 leaves the end of the rails 3 and performs its work and drops onto the horizontal surface beneath the specimen, its point of contact will be recorded on the record sheet 17 in a visual manner.

Twelve steel ball strikers comprising a set varying in weight by convenient steps were calibrated on a run way at an angle of approximately 60°, the point of release of the ball being 32.5 inches above the base, the vertical distance "y" of the center of the ball above the base, when it leaves the run way in horizontal flight being 0.737 feet, as follows:

HORIZONTAL VELOCITY AND TRANSLATIONAL KINETIC ENERGY OF STEEL BALLS ACCELERATED BY GRAVITY

*Average of fifteen tests each—Height of release 32.5 in.*

| Ball Number | Diameter, inches | Weight, Pounds | Velocity, Ft. Per Sec. | Energy, Ft. Lbs. | Variation of Energy, V. (in percent) |
|---|---|---|---|---|---|
| 1 | 0.469 | 0.0151 | 10.4 | 0.0261 | 2.1 |
| 2 | 0.484 | 0.0166 | 10.5 | 0.0298 | 2.1 |
| 3 | 0.563 | 0.0261 | 10.6 | 0.0476 | 2.0 |
| 4 | 0.594 | 0.0307 | 10.7 | 0.0558 | 1.7 |
| 5 | 0.640 | 0.0385 | 10.7 | 0.0720 | 2.0 |
| 6 | 0.703 | 0.0509 | 10.8 | 0.0957 | 2.0 |
| 7 | 0.750 | 0.0620 | 10.9 | 0.1174 | 1.0 |
| 8 | 0.796 | 0.0741 | 10.9 | 0.1429 | 1.0 |
| 9 | 0.844 | 0.0881 | 11.0 | 0.1687 | 1.9 |
| 10 | 0.906 | 0.1093 | 11.0 | 0.2107 | 1.3 |
| 11 | 0.969 | 0.1335 | 11.1 | 0.2646 | 1.1 |
| 12 | 1.000 | 0.1469 | 11.1 | 0.2889 | 1.2 |

The mathematical formula for determining the graduations on the record sheet 17 and also for determining the amount of energy required to fracture a given specimen is as follows:

$$\text{Absorbed energy} = E_1\left\{1 - \left[\frac{x_2+r}{x_1-s+r}\right]^2\right\}$$

in which:

$E_1$ is the total kinetic energy of the striker before fracture of specimen.

$x_1$ is the horizontal distance from the end of the support to the point of impact of the striker with the horizontal surface when the flight of the striker is unimpeded.

$x_2$ is the horizontal distance from the point of impact between the striker and the specimen and the point of contact between the striker and the horizontal record after breaking a specimen.

$s$ is the distance between the end of the striker support and the impact face of a specimen.

$r$ is the radius of a ball striker.

While the invention has been described with particular reference to specific embodiments, it is to be understood that it is not to be limited thereto but is to be construed broadly and restricted solely by the scope of the appended claims.

What is claimed is:

1. A device for determining the energy required to fracture a cantilevered specimen of fracturable material which includes a striker, a supporting runway therefor the major portion of which is arranged at an angle between the horizontal and the vertical, said runway having a horizontal end run, a vice for holding a specimen in the path of the striker when projected from the horizontal end run of the runway, and means for determining the residual horizontal kinetic energy of the striker after it fractures the specimen.

2. The device of claim 1 in which the runway includes parallel guide rails.

3. The device of claim 1 in which the vice is spaced from the horizontal end run of the runway a distance greater than the greatest dimension of the striker.

4. The device of claim 1 in which the vice is provided with means for vertical adjustment of the specimen.

5. The device of claim 1 in which the means for determining the residual horizontal kinetic energy of the striker after it fractures the specimen includes a horizontal record a known distance below the specimen and containing graduations indicating the portion of kinetic energy of the striker absorbed in fracturing the specimen.

6. The device of claim 1 in which the means for determining the residual horizontal kinetic energy of the striker after it fractures the specimen is a horizontal record sheet a known distance below the specimen and containing graduations indicating the portion of kinetic energy of the striker absorbed in fracturing the specimen, said record sheet being overlaid with a carbon sheet so that upon contact of the striker with the carbon sheet a visual record of the contact will appear on the record sheet.

CHARLES R. STOCK.

REFERENCES CITED

The following references are of record in the file of this patent:

UNITED STATES PATENTS

| Number | Name | Date |
|---|---|---|
| 1,329,192 | McAdam, Jr. | Jan. 27, 1920 |
| 1,636,234 | Klopsteg | July 19, 1927 |
| 2,133,308 | Reasdon | Oct. 18, 1938 |
| 2,200,028 | Kudo | May 7, 1940 |
| 2,281,324 | Preston | Apr. 28, 1942 |
| 2,294,511 | Neiman | Sept. 1, 1942 |

FOREIGN PATENTS

| Number | Country | Date |
|---|---|---|
| 125,027 | Switzerland | Mar. 16, 1928 |